Jan. 10, 1933.     A. S. FITZ GERALD     1,893,766
ELECTRIC TRANSLATION CIRCUITS
Filed April 17, 1931
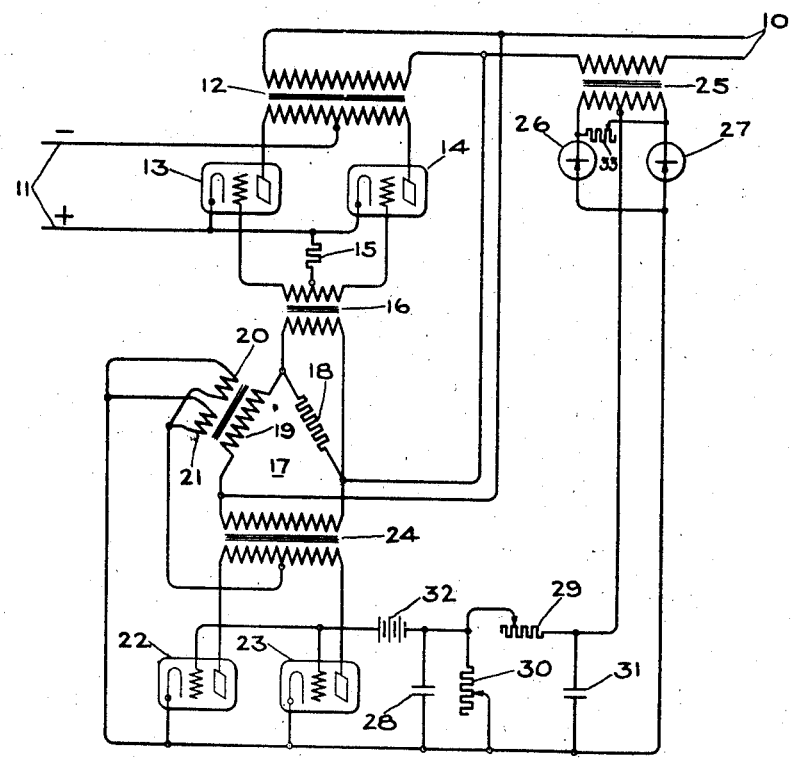
Inventor:
Alan S. FitzGerald,
by Charles V. Tullar
His Attorney.

Patented Jan. 10, 1933

1,893,766

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC TRANSLATION CIRCUITS

Application filed April 17, 1931. Serial No. 530,883.

My invention relates to electric translating circuits and more particularly to such circuits utilizing electric valves for transmitting energy from an alternating current supply circuit to a load circuit.

Heretofore numerous arrangements utilizing electric valves have been proposed for transmitting energy from an alternating current supply circuit to a load circuit, which may be either a direct current or an alternating current circuit. The majority of the arrangements of the prior art have, however, required manual attention or adjustment in order to control the amount of energy delivered to the load circuit. A completely automatic translating circuit is disclosed in United States Letters Patent No. 1,870,022, granted August 2, 1932, upon the application of David C. Prince, which broadly claims certain features disclosed in this application.

It is an object of my invention to provide an improved electric translating circuit including electric valves in which the flow of energy to the load circuit may be automatically controlled in any of a number of predetermined different manners.

It is a further object of my invention to provide an improved electric translating circuit including electric valves in which the flow of energy to a load circuit may be automatically maintained constant but in which, in the case of short circuit conditions, the flow of energy may be completely interrupted for a predetermined interval.

It is a further object of my invention to provide an improved electric translating circuit including electric valves in which, in the case of short circuit conditions, the flow of energy to the load circuit is interrupted only after a predetermined interval.

In accordance with one embodiment of my invention, I provide an arrangement for energizing a load circuit from an alternating current circuit through a pair of electric valves. In order to control the amount of energy transmitted by the electric valves I provide any of the several well known phase shifting circuits for varying the phase of the grid potentials of the valves with respect to their anode potentials. For example, I may utilize the phase shifting circuit disclosed and claimed in United States Letters Patent No. 1,851,692, granted March 29, 1932, upon the application of Myron Zucker. This phase shifting circuit comprises a resistor and a saturable reactor connected in series across the alternating current circuit. Provision is made for energizing the saturating winding of the reactor by means of a pair of rectifier valves transmitting energy from the main alternating current circuit. The energization of this saturating winding and, hence, the amount of energy transmitted by the valves in the translating circuit is determined by controlling the grid potentials of the rectifier valves as, for example, by exciting their control grids with the potential across a capacitor which may be charged in accordance with the current flowing in the alternating current circuit. For example, the secondary winding of a series transformer connected in the alternating current circuit may be connected to charge the capacitor through a rectifying device, thus serving to maintain the energy delivered to the load circuit substantially constant. According to a modification of my invention, a time delay is introduced between variations in the current flowing in the alternating current circuit and the control of the valves in the translating circuit in order to secure certain modifications of the operation of the apparatus.

For a better understanding of my invention, together with other and further objects thereof, reference is had to the accompanying drawing taken in connection with the following description, and its scope will be pointed out in the appended claims. The single figure of the accompanying drawing illustrates my invention as applied to an arrangement for transmitting energy from an alternating current circuit to a direct current load circuit, and for maintaining the transfer of energy substantially constant.

Referring now to the drawing, I have illustrated an arrangement for transmitting energy from an alternating current circuit 10 to a direct current load circuit 11. This apparatus includes a transformer 12 having a primary winding connected to the alternating current circuit 10 and a secondary winding provided with an electrical mid-point connected to the negative direct current line 11 and with two end terminals connected through electric valves 13 and 14 to the positive direct current line 11. The electric valves 13 and 14 are each provided with an anode, a cathode, and a control grid, and may be of any of the several types well known in the art, although I prefer to use valves of the vapor electric discharge type in which the starting of current in the valve is determined by the potential on its control grid, but in which current through the valve can be interrupted only by reducing its anode potential below the critical value. The grid circuits of the electric valves 13 and 14 include a current limiting resistor 15 and opposite halves of the secondary winding of a grid transformer 16, the primary winding of which is energized from a static phase shifting circuit 17. The static phase shifting circuit 17 comprises a resistor 18 and a reactor 19 serially connected across the alternating current circuit 10. The reactor 19 is provided with a pair of saturating windings 20 and 21 oppositely connected to prevent the inducing of an alternating current from the circuit 10 in the saturating winding. The saturating windings 20 and 21 are adapted to be energized through a full wave rectifier comprising electric valves 22 and 23 energized through a transformer 24 from the alternating current circuit 10. The electric valves 22 and 23 are each provided with an anode, a cathode, and a control grid, and are preferably of the high vacuum pure electron discharge type. In order to control the conductivity of electric valves 22 and 23 and thus through the phase shifting circuit 17, the amount of energy delivered by electric valves 13 and 14, I provide a grid circuit for electric valves 22 and 23 including a source of potential which varies in accordance with changes in the current drawn from the alternating current supply 10. This circuit derives its energy from a rectifier device energized from the circuit 10 by means of a series transformer, the primary winding of which is connected in the alternating current circuit. This rectifier device may be of any of the several types well known in the art, such for example, as a pair of unilaterally conductive devices shown as contact rectifiers 26 and 27. The direct current output of this rectifier device is connected across the terminals of an adjustable resistor 30 through an adjustable resistor 29. For certain types of operation it may also be desirable to connect a capacitor 28 in parallel to the resistor 30 and a second capacitor 31 directly across the direct current circuit of the rectifier 26, 27. The grid circuit of electric valves 22 and 23 includes a negative bias battery 32 and the resistor 30 connected in parallel with the smoothing capacitor 28. If desired, a potentiometer 33 may be connected across the secondary winding of transformer 25 in order to adjust the apparatus to any desired current limiting action.

In explaining the operation of the above described apparatus it will be assumed that the current drawn by the load device 11 is normal and that the constants of the phase shifting circuit 17 and its associated apparatus are such that the potentials applied to the grids of electric valves 13 and 14 are in phase with their respective anode potentials so that the valves act merely as rectifiers without restricting the load current for any value up to normal. If now the load drawn by the circuit 11 should tend to increase above normal, the current flowing through the alternating current circuit 11 will correspondingly increase so that the increased current of the secondary circuit of the transformer 25 will produce a potential drop in the resistor 30 so that its upper terminal acquires a still more negative potential. For the purposes of explanation of this phase of the operation of my improved apparatus it will be assumed that the capacitor 28 and the resistor 29 are either omitted or that they have such a value that there is no appreciable time lag between a change in current of the alternating current circuit 10 and a corresponding change in a potential of resistor 30. As the upper terminal of the resistor 30 acquires a more negative charge, the grids of electric valves 22 and 23 are correspondingly excited more negatively so that the conductivity of these valves is decreased with a decrease in current flowing in the saturating windings 20 and 21 of reactor 19. A decrease in saturation of reactor 19 increases its impedance with a result that the phase of the potential across the resistor 18, which is applied to the primary winding of grid transformer 16 is retarded with respect to the potential of the alternating current circuit 10. This retarding of the grid potential of electric valves 13 and 14 maintains them non-conducting for an initial portion of their respective half-cycles with a result that the average current transmitted by these valves is decreased. Thus, it is seen that a tendency of the load circuit 11 to draw a larger current from the supply circuit 10 is accompanied by a corresponding decrease in the average conductivity of electric valves 13 and 14 with a result that a substantially constant current is maintained. Obviously a decrease in the load drawn by the circuit 11 is accompanied by a reverse operation. By properly adjusting the potentiometer 33, the apparatus may be set to maintain the current output constant at any desired value.

By properly adjusting the series resistor 29 and the shunt resistor 30, the above described operation may be somewhat modified.

For example, the shunt resistor 30 and the series resistor 29 may be adjusted to have very high resistances so that the capacitor 28 becomes charged very slowly. With this adjustment, in the case of a sudden overload, such for example as a short circuit, the capacitor will not become charged immediately and the apparatus will be given a short interval to burn out the short circuit if possible. However, the capacitor 31 will be instantly charged to a potential dependent upon the magnitude of the overload, and its charge will be gradually transferred to the capacitor 28 at a rate dependent upon the setting of resistor 29. As the upper terminal of capacitor 28 becomes more negative, the output of the apparatus will be reduced to its normal value as explained above. On the other hand, the resistor 29 may be either omitted or adjusted to a very small value, while the resistor 30 is adjusted to a very large value. Under these conditions a short circuit will instantly completely interrupt the current flowing in electric valves 13 and 14 through the rapid charge of the capacitor 28. With the current flowing through the apparatus completely interrupted, however, no further charge will be supplied to the capacitor 28 from the rectifiers 26 and 27. After a time interval, the duration of which depends upon the setting of resistor 30, the charge of capacitor 28 will slowly leak off, thus gradually advancing the phase of the potential applied to the grids of the electric valves 13 and 14. The load current will now gradually increase to its normal value and be maintained constant at that value. While I have shown the load circuit 11 as comprising a direct current circuit energized through the full wave rectifier comprising electric valves 13 and 14, it will be obvious that the load circuit may be an alternating current circuit, if desired, in which case electric valves 13 and 14 would be connected in parallel and in opposition in one side of the alternating current circuit. It will also be obvious to those skilled in the art that any other type of phase shifting circuit may be substituted in place of the static phase shifting circuit 17 without departing from my invention.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by United States Letters Patent is:—

1. In a system of distribution, an alternating current supply circuit, a load circuit, an electric valve for transmitting energy from said supply circuit to said load circuit, and means responsive to a predetermined overload on one of said circuits for maintaining said valve non-conducting for a predetermined interval and thereafter gradually increasing the conductivity of said valve.

2. In combination, an alternating current supply circuit, a load circuit, an electric valve for transmitting energy from said supply circuit to said load circuit, a second electric valve for controlling the conductivity of said first valve, said second valve being provided with a control grid, a capacitor for energizing said control grid adapted to be charged in accordance with the current transmitted by said first valve, and a resistor in the charging circuit of said capacitor for effecting a predetermined time delay between variations of said valve current and the controlling effect of said second valve.

3. In combination, an alternating current supply circuit, a load circuit, an electric valve for transmitting energy from said supply circuit to said load circuit, a second electric valve for controlling the conductivity of said first valve, said second valve being provided with a control grid, a capacitor associated with said control grid and adapted to be charged in accordance with the current transmitted by said first valve, and a discharge circuit for said capacitor including a resistor for effecting a predetermined time delay between variations of said valve current and the controlling effect of said second valve.

4. In combination, an alternating current supply circuit, a load circuit, an electric valve provided with a control grid for transmitting energy from said supply circuit to said load circuit, an impedance phase shifting circuit comprising a plurality of impedance elements associated with said control grid, a second electric valve, provided with a control grid for controlling the impedance of one of said impedance elements, an energy storage element associated with the grid of said second valve, and means for storing energy in said storage element in accordance with the current transmitted by said first valve.

5. In combination, an alternating current supply circuit, a load circuit, an electric valve provided with a control grid for transmitting energy from said supply circuit to said load circuit, an impedance phase shifting circuit comprising a plurality of impedance elements associated with said control grid, a second electric valve, provided with a control grid, for controlling the impedance of one of said impedance elements, a capacitor connected to the grid of said second valve, means for charging said capacitor in accordance with the load on said supply circuit, a resistor in the charging circuit of said capacitor and a discharge circuit for said capacitor including a second resistor.

6. In combination, an alternating current supply circuit, a load circuit, an electric valve provided with a control grid for transmitting energy from said supply circuit to said load circuit, a second electric valve, provided with a control grid for controlling the conductivity of said first valve, a capacitor connected to the grid of said second valve, a series transformer connected in said supply circuit, and means for rectifying the output of said series transformer to charge said capacitor.

In witness whereof, I have hereunto set my hand.

ALAN S. FITZ GERALD.